(No Model.)
J. A. COOK.
APPARATUS FOR THE MANUFACTURE OF SUGAR, SALT, &c.
No. 277,833. Patented May 15, 1883.
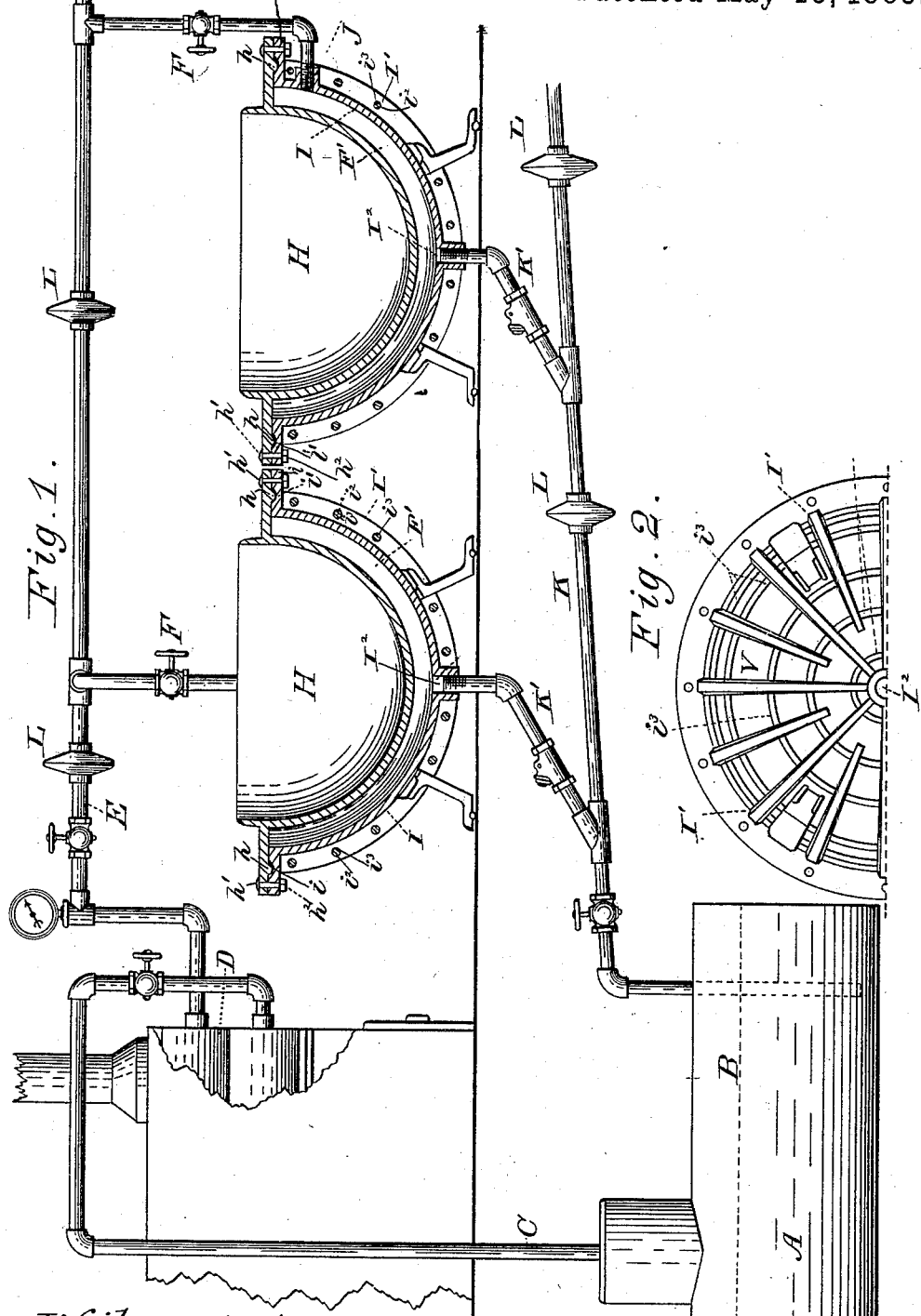
Witnesses:
F. P. Taber
Frank R. Rathbun
Inventor:
Joseph. A. Cook.

UNITED STATES PATENT OFFICE.

JOSEPH A. COOK, OF AUBURN, NEW YORK.

APPARATUS FOR THE MANUFACTURE OF SUGAR, SALT, &c.

SPECIFICATION forming part of Letters Patent No. 277,833, dated May 15, 1883.

Application filed April 16, 1883. (No model.)

*To all whom it may concern:*

Be it known that I, JOSEPH A. COOK, of Auburn, county of Cayuga, State of New York, have invented new and useful Improvements in Apparatus for the Manufacture of Sugar, Salt, &c., of which the following is a full and exact description, reference being had to the accompanying drawings, making part of this specification, in which—

Figure 1 is a side view of the apparatus complete, showing the manner of connecting the boiler and superheater with the kettles or pans, and showing two pans in section; and Fig. 2 is a bottom view of a section of one of the jackets employed.

My invention relates to certain improvements in the apparatus for the manufacture of sugar, salt, &c., upon which Letters Patent were issued to Franklin P. Taber, No. 268,056, November 28, 1882; and the invention consists, first, in providing the outer face of the jackets with projecting ribs, and to the combination, with said ribs, of the wires connected therewith for receiving and holding a non-conducting material upon said outer face.

It further consists in the employment, with a series of kettles or pans surrounded by the steam-spaces and with the boiler-supply and return pipes, of a superheater for superheating the steam in its passage from the boiler to the kettles or pans.

It further consists in the combination, with the kettles or pans surrounded by the steam-spaces and with the boiler and superheater, of the return-pipe for returning the water of condensation to the boiler above the water-line and into or through the steam-space thereof.

It further consists in the combination, with kettles or pans and with the boiler and superheater, of the supply and return pipes provided with the expansion-joints, as hereinafter described.

In the accompanying drawings, A represents an ordinary steam-boiler for generating the steam, the water-line of which is represented at B. A steam-supply pipe extends from this boiler to the superheater D, as shown at C.

E is a suitable pipe for carrying the steam from the superheater either directly to the steam-spaces surrounding the kettles or pans, or through laterals F F, connected therewith and with said steam-spaces F' F', as shall be found most desirable. The steam-pipe, or the laterals thereof, penetrate the steam-spaces formed between the kettle and jacket at a point, J, just below the flange or rim of the jacket instead of through the flange of the kettle, as in the patent heretofore referred to.

H H represent the kettles, which may be made in any usual or preferred manner, except that the projecting flanges thereof, by which they are secured to the jackets I, are provided on their lower faces with a projecting rib, $h$, extending around the same, and which ribs enter and engage a corresponding groove or depression, $i$, formed in the rim $i'$ of the jacket I, hereinafter referred to. The kettle or pan and its surrounding jacket are connected together through the projecting flanges, constructed as above described, by means of bolts and nuts $h'$ $h^2$, as shown. These flanges have inserted between them, previous to being drawn together by the bolts and nuts, a suitable cement, which serves, when thus drawn together, to form a perfect steam-fitting joint between the kettle or pan and the surrounding jacket. The jacket I is made in any convenient shape conforming to the shape of the kettle or pan employed, and is provided on its lower face with projecting ribs $I'$, extending from the flange thereof to the opening $I^2$, formed in said jacket for the escape of the water of condensation. These ribs are perforated at suitable distances throughout their entire length, as shown at $i^2$, to receive and hold wires $i^3$ for receiving and holding a suitable non-conducting material upon the outer face of said jacket.

A pipe for carrying the water of condensation from the steam-spaces back to the boiler is shown at K, and is connected with said steam-spaces by means of suitable laterals, K' K', connected to said pipe and to the spaces in any usual or preferred manner. This pipe is connected to the boiler through a suitable opening made in the top thereof, and said pipe may either extend into the steam-space or through said steam-space to a point below the water-line, as shall be found most desirable.

By returning the water of condensation to the boiler through a pipe connected therewith, as above described, it will be seen that the same is heated in passing into or through the steam-space thereof, and when discharged therefrom into the water in the boiler it has attained about the temperature of said water, thereby greatly increasing the efficiency of the apparatus and serving to assist in generating the steam in a much shorter time and with less fuel than where the water is returned to the boiler in a cooled state.

The steam-supply and return pipes are provided at suitable distances along their length with expansion-joints L, by means of which the expansion or contraction of the pipes, when subjected to heat or cold, is neutralized and all liability of the joints through which they are connected with the boiler, superheater, and laterals being loosened, and the consequent leakage thereof is effectually obviated.

The superheater D heretofore referred to is constructed in any usual or preferred manner, and is located in such relation to the boiler and kettles or pans that the steam in its passage from the boiler to the steam-spaces surrounding said kettles or pans is caused to pass through the same and their superheater, by which means it will be readily seen that the temperature thereof is greatly increased, and also its utility as an evaporating medium without materially increasing the pressure on the kettles or pans.

Parts of the apparatus not particularly herein described may be constructed in any usual or preferred manner.

Having now described my invention, I claim—

1. The projecting ribs formed with the jacket provided with the perforations, in combination with the wires connected therewith, substantially as described, for receiving and holding the non-conducting material upon the face of said jacket, as set forth.

2. In an evaporator, the combination, with the kettles or pans surrounded by the steam-spaces, and with the boiler for generating the steam, of a superheater and the supply and return pipes, forming a continuous passage to and from the boiler, substantially as and for the purpose set forth.

3. In an evaporating apparatus, the combination, with the kettles or pans surrounded by the steam-spaces, the boiler for generating the steam, the superheater, and the supply-pipe, of the return-pipe for returning the water of condensation to the boiler above the water-line, said pipe extending into or through the steam-space of the boiler, substantially as and for the purpose set forth.

4. In an evaporating apparatus, the combination, with the kettles or pans surrounded by the steam-spaces, the boiler for generating the steam, and the superheater, of the supply and return pipes, provided with the expansion-joints, substantially as and for the purpose set forth.

In testimony whereof I have hereunto set my hand this 4th day of April, A. D. 1883.

JOSEPH A. COOK.

Witnesses:
WARREN C. STONE,
H. N. JENKINS.